(12) United States Patent
Huang et al.

(10) Patent No.: US 8,520,174 B2
(45) Date of Patent: Aug. 27, 2013

(54) PATTERNED RETARDER FILM AND METHOD FOR MANUFACTURING

(75) Inventors: Kuan-Hao Huang, Longtan Township, Taoyuan County (TW); Fung-Hsu Wu, Gueishan Township, Taoyuan County (TW)

(73) Assignee: Benq Materials Corp., Taoyuan County (TW)

( * ) Notice: Subject to any disclaimer, the term of this patent is extended or adjusted under 35 U.S.C. 154(b) by 375 days.

(21) Appl. No.: 12/973,045

(22) Filed: Dec. 20, 2010

(65) Prior Publication Data

US 2011/0292329 A1 Dec. 1, 2011

Related U.S. Application Data

(60) Provisional application No. 61/348,768, filed on May 27, 2010, provisional application No. 61/367,033, filed on Jul. 23, 2010.

(51) Int. Cl.
*G02F 1/1335* (2006.01)

(52) U.S. Cl.
USPC ............... 349/117; 349/118; 349/119

(58) Field of Classification Search
None
See application file for complete search history.

(56) References Cited

U.S. PATENT DOCUMENTS

| | | | |
|---|---|---|---|
| 2,631,496 A | 3/1953 | Rehorn | |
| 2,647,440 A | 8/1953 | Rehorn | |
| 5,692,226 A | 11/1997 | Hall | |
| 6,002,518 A | 12/1999 | Faris | |
| 6,046,787 A | 4/2000 | Nishiguchi | |
| 6,192,226 B1 | 2/2001 | Fang | |
| 6,195,205 B1 | 2/2001 | Faris | |
| 6,498,679 B2 | 12/2002 | Lee et al. | |
| 6,624,863 B1 | 9/2003 | Jacobs et al. | |
| 6,963,356 B2 | 11/2005 | Satoh | |
| 7,050,233 B2 | 5/2006 | Nikolov et al. | |
| 7,414,782 B2 | 8/2008 | Jung | |
| 7,440,044 B2 | 10/2008 | Peterson et al. | |
| 7,580,085 B2 | 8/2009 | Jacobs et al. | |
| 7,623,111 B2 | 11/2009 | Ioki et al. | |
| 7,969,541 B2 * | 6/2011 | Okuyama et al. | 349/117 |
| 2010/0149472 A1 * | 6/2010 | Hoshi | 349/119 |

* cited by examiner

*Primary Examiner* — Thanh-Nhan P Nguyen
(74) *Attorney, Agent, or Firm* — McClure, Qualey & Rodack, LLP

(57) ABSTRACT

A patterned retarder film and a method for manufacturing the same are provided. A patterned retarder film with a microstructure comprises a first substrate, a phase retardation layer on the first substrate comprising a plurality of first retardation regions of liquid crystal materials and a plurality of second retardation regions of curable resin, wherein the structures of the first retardation regions and the second retardation regions are grating-like stripe structures and parallelly interleaved with each other and the first retardation regions provide a first phase retardation and the second retardation regions provide a second phase retardation; and a second substrate laminated on the phase retardation layer; wherein the first phase retardation and the second phase retardation are different by 180°. The method for manufacturing the patterned retarder film is also disclosed

20 Claims, 5 Drawing Sheets

PATTERNED RETARDER FILM AND METHOD FOR MANUFACTURING

This application claims the benefit of U.S. provisional application Ser. No. 61/348,768, filed May 27, 2010, and U.S. provisional application Ser. No. 61/367,033, filed Jul. 23, 2010, the subject matters of which are incorporated herein by reference.

BACKGROUND OF THE INVENTION

1. Field of the Invention

The invention relates in general to a patterned retarder film and a method for manufacturing thereof, and more particularly to an embossing method for manufacturing a patterned retarder film.

2. Description of the Related Art

It is known that applying a patterned retarder to a liquid crystal display screen, a three-dimensional stereo imaging can thus be provided for audience wearing a pair of polarization glasses. Several approaches are disclosed to manufacture a patterned retarder Some methods for manufacturing patterned retarder film are provided in the related art, such as a method of making a patterned retarder disclosed in U.S. Pat. No. 6,624,863 and a micro-retarder plate using a single plate with phase retardation disclosed in U.S. Pat. No. 6,498,679.

The present invention intends to provide a novel method for manufacturing patterned retarders with an embossing treatment.

SUMMARY OF THE INVENTION

The invention is to provide a patterned retarder firm and a method for manufacturing thereof, and especially an embossing method for manufacturing a patterned retarder film.

According to an aspect of the present invention, a patterned retarder film with a micro-structure is provided. The present patterned retarder film comprises a first substrate, a phase retardation layer on the first substrate and a second substrate laminated on the phase retardation layer. The phase retardation layer comprises a plurality of first retardation regions of liquid crystal materials and a plurality of second retardation regions of curable resin, wherein the structures of the first retardation regions and the second retardation regions are grating-like stripe structures and parallelly interleaved with each other. The first retardation regions provide a first phase retardation and the second retardation regions provide a second phase retardation and the first phase retardation and the second phase retardation are different by 180°. Furthermore, an alignment layer is provided to the first regions of the phase retardation layer in order to align with the liquid crystal in said regions.

According to another aspect of the present invention, a method for manufacturing a patterned retarder film with a micro-structure is provided. The method for manufacturing the present patterned retarder film comprises the following steps. A first substrate is provided. A curable resin is coated on the first substrate. The curable resin is embossed with a predetermined pattern to form a patterned configuration comprising a plurality of first regions and a plurality of second regions, wherein the patterned configuration has a grating-like stripe structure and of which the first regions are grating grooves and parallelly interleaved with the second regions. The patterned configuration is then cured. An alignment layer is formed on the surface of the patterned configuration. A liquid crystal material is disposed on the alignment layer in the first regions of the patterned configuration in order together with the second regions to form a phase retardation layer. A second substrate is provided to be pressed-laminated on the phase retardation layer. The laminated patterned retarder film is conducted a heating treatment to align the liquid crystal materials of the first regions with the alignment layer and then cured by a curing treatment. The first regions provide a first phase retardation and the second regions provide a second phase retardation and the first phase retardation and the second phase retardation are different by 180°.

Alternatively, the alignment layer can be formed on the second substrate instead to be formed on the surface of the patterned configuration.

In another aspect of the patterned retarder film of present invention, the present patterned retarder film is adhered to at least one functional optical film such as, for example, polarizing film, hard-coating film, low reflective film, anti-reflective film and anti-glaring film.

In further another aspect of the patterned retarder film of the present invention, the patterned retarder film is adhered to a display panel to provide a stereo image to the viewers.

The above and other aspects of the invention will become better understood with regard to the following detailed description of the preferred but non-limiting embodiment(s). The following description is made with reference to the accompanying drawings.

DETAILED DESCRIPTION OF THE INVENTION

Please note the drawings shown in the Figures are for illustrative purposes only and not to scale.

Figure 1:
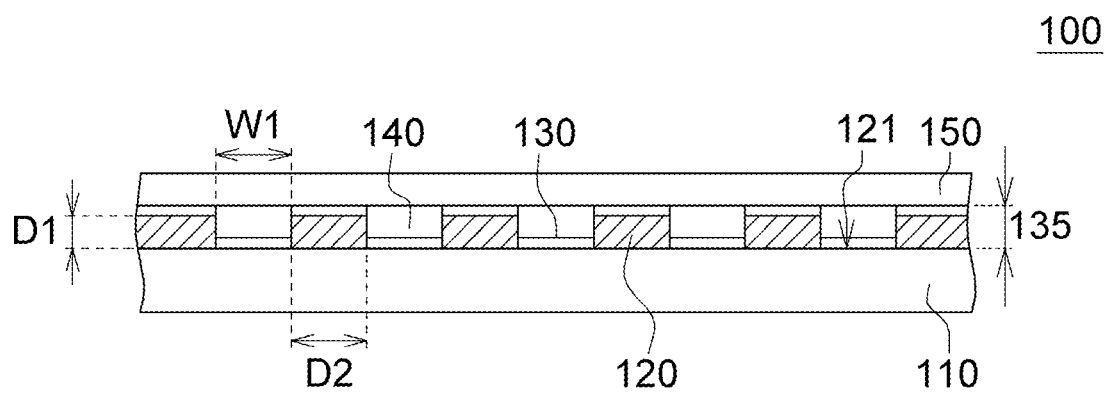
FIG. 1 is a cross-sectional view of a patterned retarder film of an embodiment of the present invention.

FIG. 1 shows a cross-sectional view of a patterned retarder film 100 provided by an embodiment of the present invention. The patterned retarder film 100 includes a first substrate 110, a phase retardation layer 135 and a second substrate 150. The phase retardation layer 135 comprises a plurality of first retardation regions 140 of liquid crystal materials and a plurality of second retardation regions 120 of curable resin, wherein the structures of the first retardation regions and the second retardation regions are grating-like stripe structures and parallelly interleaved with each other. The liquid crystal materials in first retardation regions 140 is aligned with the alignment layer 130 formed on the bottom 121 thereof. The first retardation regions 140 provide a first phase retardation and the second retardation regions 120 provide a second phase retardation and the first phase retardation and the second phase retardation are different by 180°.

The first substrate 110 and the second substrate 150 are, for example, poly(ethylene terephthalate) (PET), polycarbonate (PC), triacetyl cellulose (TAC), poly(methyl methacrylate) (PMMA) or cyclo-olefin polymer (COP). In an embodiment of the patterned retarder film of the present invention, the first substrate 110 and the second substrate 150 are the same substrates. In another embodiment of the patterned retarder film of the present invention, the first substrate 110 and the second substrate 150 are different substrates, wherein of which the phase retardation, thickness, or materials used are different. The thickness of the first substrate 110 and the second substrate 150 is in the range of 30 microns to 300 microns. The phase retardation of the first substrate 110 and the second substrate 150 is less than 90°. Preferably, the phase retardation of the first substrate 110 and the second substrate 150 is substantially 0°.

The thickness D1 of phase retardation layer 135 is in the range of 0.1 micron to 9.9 microns, preferably in the range of 1 micron to 4 microns. The thickness of the phase retardation layer is determined by that a phase retardation as, for example, ½ λ (wavelength unit) is provided at such a thickness of the first retardation regions 140. In addition, the phase retardation of the first retardation regions 140 depends on the properties of the polymerizable liquid crystal materials used, such as the phase retardation thereof provided, and the thickness thereof, which are well known to any artisan skilled in the art. In a preferred embodiment, the liquid crystal material of the first retardation regions 140 is RMS10-021 (UV curable reactive mesogen solution, available from Merck Display Tech Ltd, Taiwan), the thickness of the first retardation regions 140 is 2.1 microns. The width W1 of each of the first retardation regions 140 is in the range of 10 microns to 900 microns, and the distance D2 between every two adjacent first retardation regions 140 is in the range of 10 microns to 900 microns, which are determined according to the pitch size and the viewing distance of the display panel applied. For example, in an embodiment of the patterned retarder film of the present invention, for a 15.6-inch LC display panel (156XW01, AUO), the width W1 of each of the first retardation regions 140 is about 250 microns.

Figure 5:
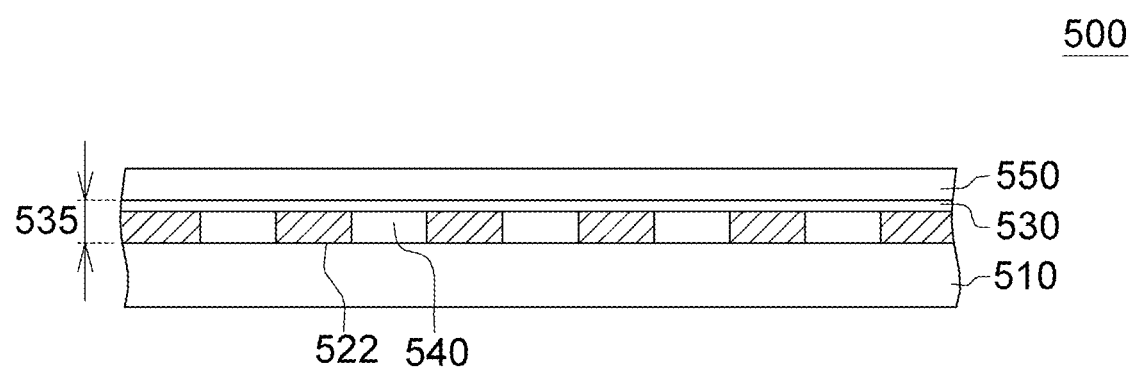
FIG. 5 is a cross-sectional view of a patterned retarder film of another embodiment of the present invention.

In an embodiment of the patterned retarder film of the present invention, the alignment layer 130 is formed at the bottom 121 of the first retardation regions 140, as shown in FIG. 1, in order to align the liquid crystal materials thereof. In another embodiment of the patterned retarder film of the present invention, as shown in FIG. 5, an alignment layer 530 is formed on the second substrate 550 to align with the liquid crystals materials of the first retardation regions 540 after the alignment layer 530 on the second substrate 550 is laminated on the phase retardation layer 535.

Figure 2:
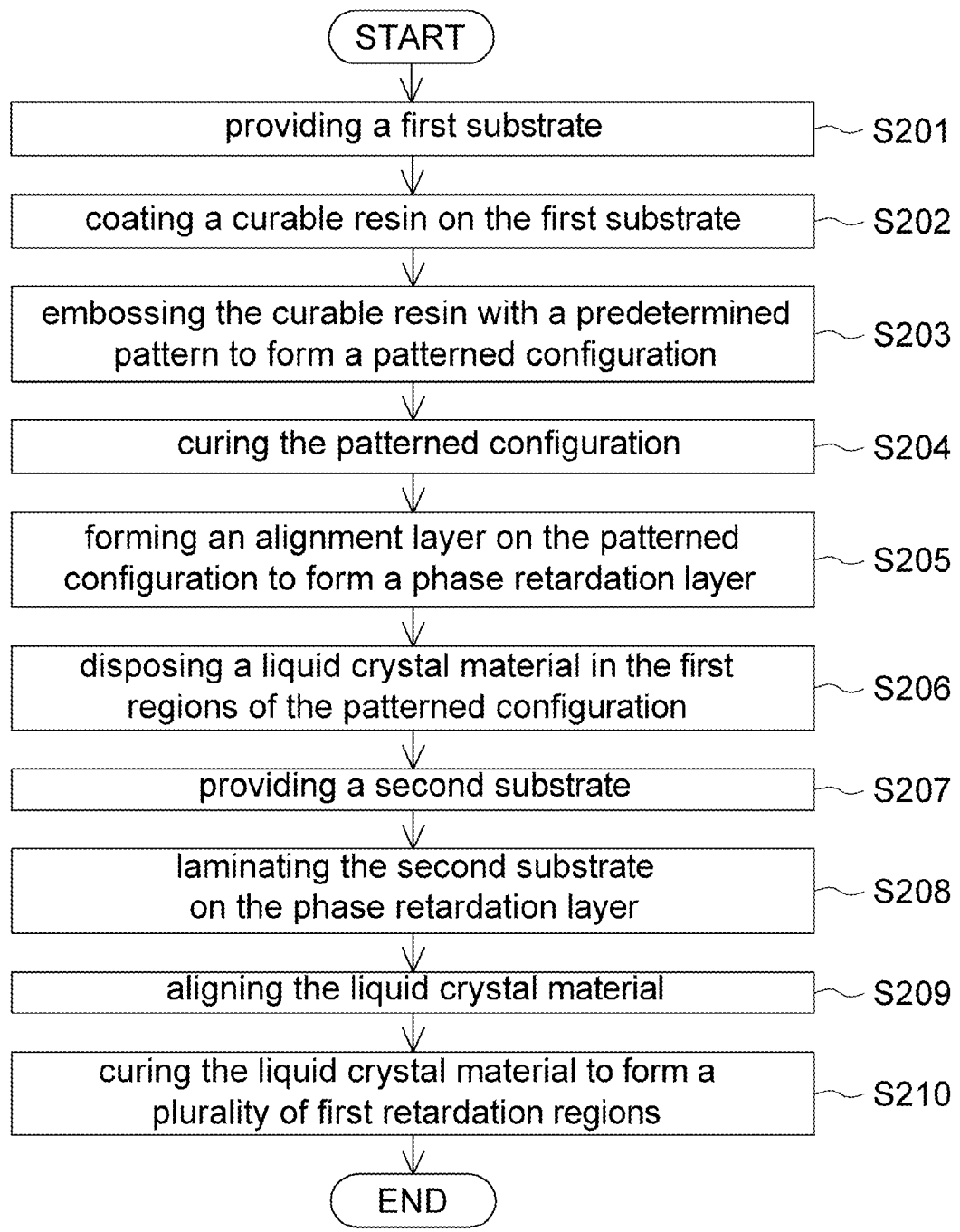
FIG. 2 is a flow chart of a method for manufacturing a patterned retarder film of an embodiment of the present invention.

A preferred embodiment of the method of the present invention is illustrated by FIG. 2 together with FIGS. 3A to 3D. FIG. 2 is a flow chart of a method for manufacturing a patterned retarder film of an embodiment of the present invention. FIGS. 3A to 3D illustrate the steps in a method for manufacturing a patterned retarder film of an embodiment of the present invention.

In step S201, a first substrate 310 is provided. The phase retardation of the first substrate 310 is less than 90°. Preferably, the phase retardation of the first substrate 310 is substantially 0°. The first substrate 310 can be poly(ethylene terephthalate) (PET), polycarbonate (PC), triacetyl cellulose (TAC), poly(methyl methacrylate) (PMMA) or cyclo-olefin polymer (COP). The thickness of the first substrate 310 is in the range of 30 microns to 300 microns.

Figure 3A:
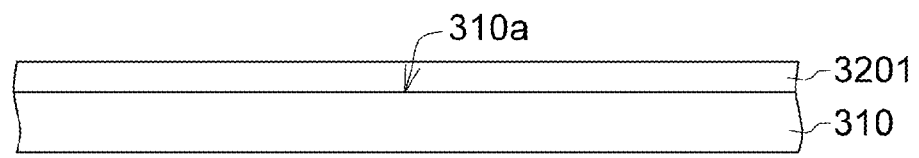
FIGS. 3A to 3D illustrate the steps in a method for manufacturing a patterned retarder film of an embodiment of the present invention.
Figure 4:
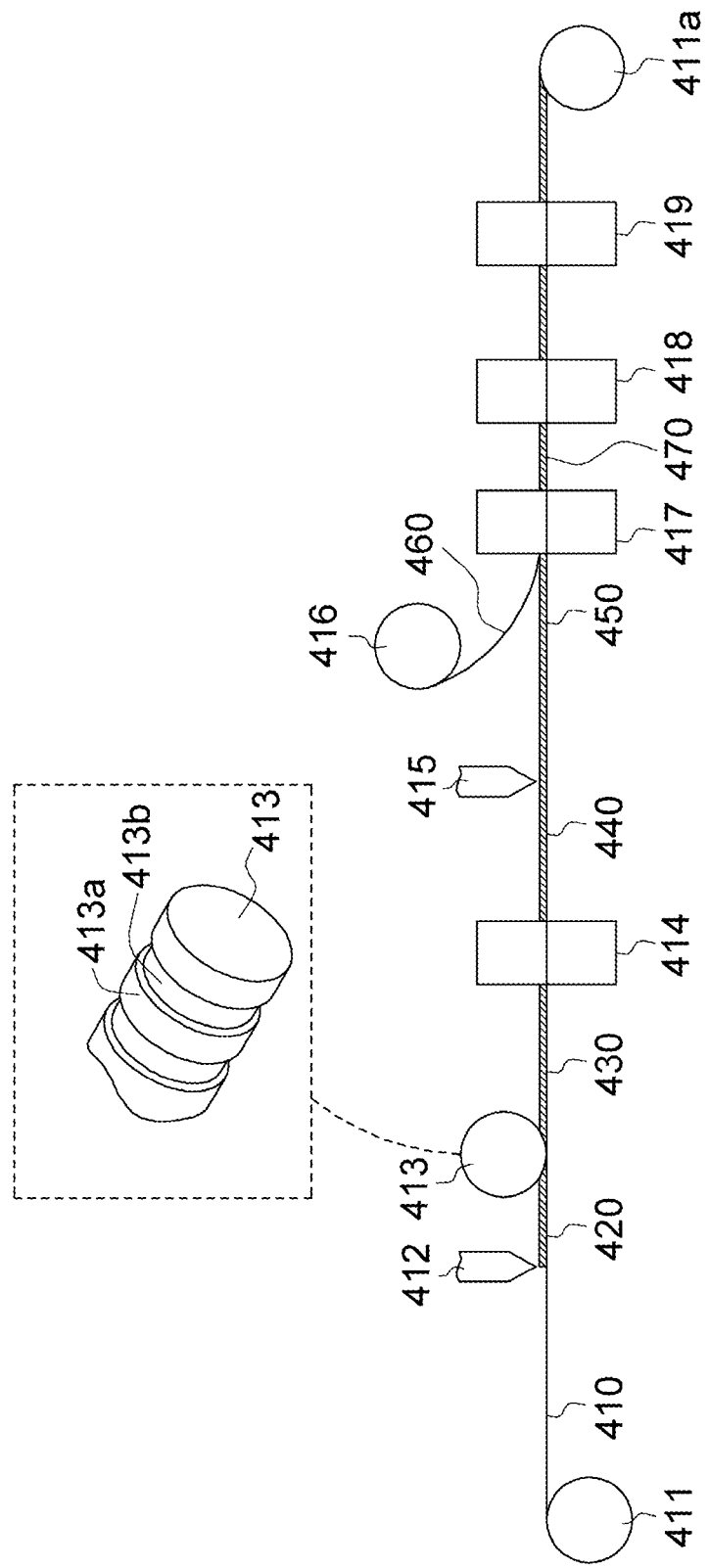
FIG. 4 is a diagrammatic view of a system used for manufacturing a patterned retarder film of a patterned retarder film of an embodiment of the present invention.

In step S202, a curable resin 3201 is coated on the surface 310a of the first substrate 310 as shown in FIG. 3A. The curable resin 3201 is coated by a process known to skilled in the art, such as die coating or gravure coating. The curable resin 3201 can be a UV curable resin or a thermo-curable resin, such as, for example, acrylic resin, silicone and polyurethane. In step S203, the curable resin 3201 is embossed with a predetermined pattern to form a patterned configuration 320 on the first substrate 310, which comprises a plurality of first regions 321 and a plurality of second regions 322. The embossing treatment is carried out by a stamp or a roller with a predetermined pattern on the surface thereof. In an embodiment of the method of the present invention, the embossing treatment is carried out by such as a molding roller 413 as shown in FIG. 4. The surface of the molding roller 413 is arranged with a set of relief structures 413a and a set of groove structures 413b. The set of relief structures 413a is extended in the rotating direction of the molding roller 413. In another embodiment of the method of the present invention, the set of relief structures 413a is extended in a direction perpendicular to the rotating direction of the molding roller 413 (not shown in Drawings).

Figure 3B:
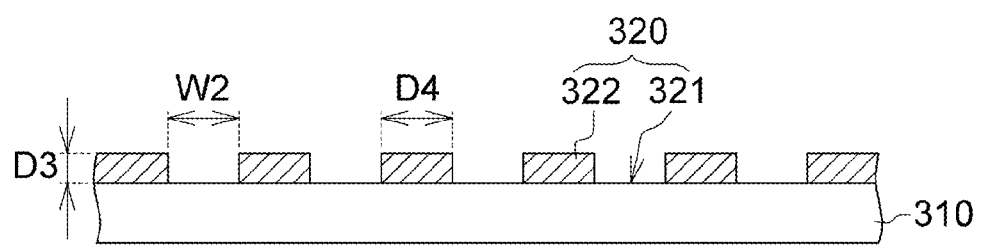

As the curable resin 3201 on the first substrate 310 passes through the molding roller 413, a grating-like patterned configuration 320 is formed as shown in FIG. 3B. The patterned configuration 320 includes a plurality of first regions 321 and a plurality of second regions 322, and the first regions 321 are grating grooves and parallely interleaved with the second regions 322. The depth D3 and the width W2 of each grating groove and the distance D4 between every two adjacent grating grooves are determined as mentioned hereinbefore. The depth D3 of each grating groove is in the range of 0.1 micron to 9.9 microns, and the width W2 of each grating groove is in the range of 10 microns to 900 microns. The distance D4 between every two adjacent grating grooves is in the range of 10 microns to 900 microns.

In Step S204, the patterned configuration 320 is cured. The curing treatment can be such as a UV curing treatment or a thermo-curing treatment.

Figure 3C:
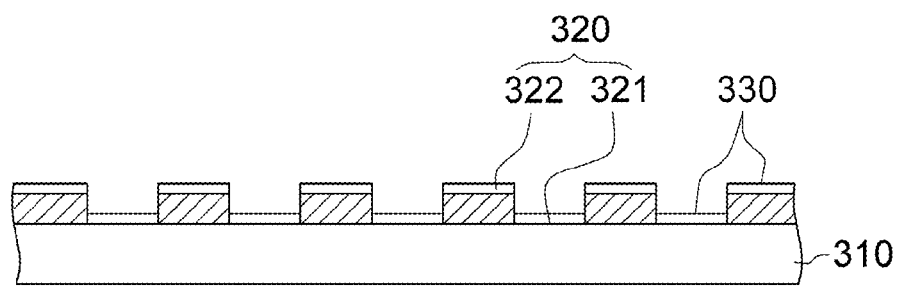

After the patterned configuration 320 is cured in step S204, an alignment layer 330 is formed on the surface of the patterned configuration 320 in step S205 as shown in FIG. 3C. The alignment layer 330 is formed by a process known to skilled in the art, such as micro-scratch alignment treatment, rubbing treatment, photo-alignment, SiO$_2$ evaporation, or ion beam alignment. In another embodiment of the method of the present invention, the alignment layer is unnecessary to form on the surface of the patterned configuration 320. In such a case, the alignment layer can be formed on the second substrate and to be laminated on the phase retardation layer 535, as shown in FIG. 5. Similarly, the alignment layer formed on the second substrate is formed by a process known to skilled in the art, such as micro-scratch alignment treatment, rubbing treatment, photo-alignment, SiO$_2$ evaporation, or ion beam alignment.

In step S206, a liquid crystal material is disposed in the first regions 321 of the patterned configuration 320. The liquid crystal material is disposed by a process known to skilled in the art. In an embodiment of the method of the present invention, the disposing process is conducted by coating, for example, die coating or gravure coating. In an embodiment of the method of the present invention, the liquid crystal material is polymerizable liquid crystal materials, such as, for example, BASF LC242 (photopolymerizable liquid crystal diacrylate, available from BASF Co., Germany) and RMS 10-021 (UV curable reactive mesogen solution, available from Merck Display Tech Ltd, Taiwan). The liquid crystal material can be mixed in solvent(s) before used to produce a liquid crystal material solution for the following coating process. The solid content of the liquid crystal material solution is in the range from 10% to 50%, preferably, the solid content of the liquid crystal material solution is about 20%. The solvent(s) used is known to skilled in the art, such as, for example, propylene glycol monomethyl ether acetate (PG-MEA). In the present embodiment, the liquid crystal material solution is coated crossover the surface of the patterned configuration 320 with a predetermined thickness according to the solid content of the liquid crystal material solution used in order to, after the solvent is removed, enable the thickness of the liquid crystal materials to provide a phase retardation as, for example, ½ λ (wavelength unit). And then, a heating treatment is conducted to remove the solvent(s) contained in the liquid crystal material solution. The temperature of the heating treatment is in the range from about 45° C. to about 58° C., preferably at about 55° C. After the solvent(s) is removed, the liquid crystal material is filled in the grating grooves of the first regions 321 to form the phase retardation layer 335. In another embodiment of the method of the present invention, the liquid crystal material can be solvent-free and is coated on the patterned configuration 320 to fill in the first regions 321. The coating process of the solvent-free liquid crystal material can be facilitated by a pre-heating treatment.

In step S207, a second substrate 350 is provided. In an embodiment of the method of the present invention, the second substrate 350 can be the same substrate as the first substrate 310. In another embodiment, the second substrate 350 can be a different substrate from the first substrate 310. For example, the phase retardation or the material used for the first substrate and the second substrate can be different. In step S208, the second substrate 350 is pressed-laminated on the surface of the phase retardation layer 335. As pressed-laminating the second substrate 350, the liquid crystal material on the second regions 322 will be pressed into the first regions 321 or out of the surface of the second regions 322 in step 208.

In another embodiment of the method of the present invention, the second substrate 350 is laminated on the phase retardation layer 335 with the alignment layer thereon. In the present embodiment, the alignment layer is formed on the second substrate 350 before the lamination (not shown in Drawings). The alignment layer can be formed by a process known to skilled in the art, such as micro-scratch alignment treatment, rubbing treatment, photo-alignment, SiO$_2$ evaporation, or ion beam alignment. In still another embodiment, a patterned retarder film in which alignment layers are both provided at the bottom of the first regions 321 and on the second substrate are obtainable only if the alignment directions of these two alignment layers are substantially the same.

After the second substrate 350 is laminated on the phase retardation layer 335 in step S208, the patterned retarder film 300 is conducted an alignment treatment to align the liquid crystal material in step S209. In an embodiment of the method of the present invention, the liquid crystal material is aligned with the alignment layer 330 on the bottom of the first regions 321. In another embodiment of the method of the present invention, the liquid crystal material is aligned with the alignment layer on the second substrate 350. In a further embodiment of the method of the present invention, the liquid crystal material is aligned with both the alignment layers at the bottom of the first regions 321 and on the second substrate. In an embodiment of the method of the present invention using RMS10-021 as the liquid crystal material, the liquid crystal material is heated at a temperature in the range from about 40° C. to about 65° C., preferably from about 45° C. to about 58° C. In a preferred embodiment of the method of the present invention, the temperature for aligning treatment is at 55° C.

Figure 3D:
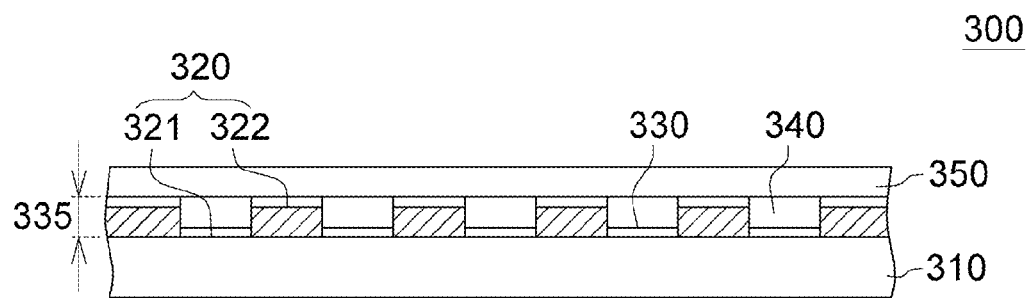

In step 210, the patterned retarder film 300 is conducted a curing treatment in order cure the liquid crystal materials in the first regions 321 to provide a plurality of first retardation regions 340. The curing treatment can be such as a UV curing treatment or a thermo-curing treatment. In an embodiment of the method of the present invention using RMS10-021 as the liquid crystal material to form the first retardation regions 340, the thickness of the first retardation regions 340 is 2.1 microns. Thus, with substantially zero phase retardation of the second regions 322, the phase retardation of the first retardation regions 340 and the phase retardation of the second regions 322 are different by 180° in the patterned retarder film 300 manufactured as shown in FIG. 3D. In another embodiment of the method of the present invention, where the alignment layer 530 is formed on the second substrate 550 aforementioned, as shown in FIG. 5, the phase retardation of the first retardation regions 540 and the phase retardation of the second regions 522 are different by 180°.

The present method for manufacturing a patterned retarder film can be carried out by a batch production or a continuous production. FIG. 4 is a diagrammatic view of a system used for manufacturing a patterned retarder film of an embodiment of the present invention in a continuous production, such as, for example, a roll-to-roll system. The system 400 is for manufacturing the present patterned retarder film. A first substrate 410 is unwound from a first roller 411 and conveyed to pass through a coating means 412 to be coated a curable resin 420 thereon. The curable resin 420 is then conducted an embossing treatment with a molding roller 413 as the aforementioned to form a patterned configuration 430 of a grating-like structure with a plurality of first regions and a plurality of second regions, wherein the first regions are grating grooves and parallelly interleaved with the second regions. The patterned configuration 430 is then conducted a curing treatment via a curing means 414. The curing means 414 is a UV curing means or a thermo-curing means. In an embodiment of the method for manufacturing the patterned retarder film of the present invention, after the patterned configuration 430 is cured, an alignment layer is then formed on the cured patterned configuration 440 via an alignment means (not shown). The cured patterned configuration 440 is then coated with a liquid crystal material via a Liquid crystal coating means 415. In an embodiment of the method for manufacturing the patterned retarder film of the present invention, the liquid crystal material is mixed with solvent(s) to form a liquid crystal material solution (UV curable reactive mesogen solution) and is coated on the cured patterned configuration 440 followed by a heating treatment to remove the solvent(s) contained in the liquid crystal material solution and simultaneously align the liquid crystal material. The temperature of the heating treatment is in the range from about 45° C. to about 58° C., preferably at about 55° C. In another embodiment of the method for manufacturing the patterned retarder film of the present invention, the liquid crystal material is solvent-free and coated on the cured patterned configuration 440 directly via the liquid crystal coating means 415.

A second substrate 460 is unwound from a second roller 416 and laminated on the liquid crystal coated patterned configuration 450 via a lamination means 417. In the present embodiment, the surface of the second substrate 460 and the surface of the liquid crystal coated patterned configuration 450 are allowed to be pressed together tightly by the lamination means 417, such as two rollers, wherein the pressure of the lamination is determined by the distance between the two rollers. In an embodiment of the method for manufacturing the patterned retarder film of the present invention, the second substrate 460 is laminated on the liquid crystal coated patterned configuration 450 with the alignment layer thereon. In another embodiment of the method for manufacturing the patterned retarder film of the present invention, an alignment layer is formed on the second substrate (not shown) before the lamination treatment, and the second substrate with the alignment layer thereon is then pressed-laminated on the phase retardation layer (not shown). After the lamination treatment, the laminated film 470 passes through an aligning means 418 for aligning the liquid crystal material with the alignment layer therein. In an embodiment of the method for manufacturing the patterned retarder film of the present invention, the alignment treatment is conducted at a temperature in the range from about 45° C. to about 58° C. In a preferred embodiment of the method for manufacturing the patterned retarder film of the present invention, the temperature is at about 55° C. After the alignment treatment, a curing treatment is carried out via a liquid crystal curing means 419. The liquid crystal curing means 419 is a UV curing means or a thermo-curing means. Followed by the curing treatment, the patterned retarder film is sequentially wound on a roller 411*a* as shown in FIG. 4.

The present patterned retarder film manufactured by one embodiment of the method of the present invention can be adhered at least one of functional optical films, such as hard-coating film, low reflective film, anti-reflective film and anti-glaring film, on the surface thereof in order to provide additional desired optical functionalities.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A patterned retarder film with a micro-structure comprising
   a first substrate,
   a phase retardation layer on the first substrate comprising a plurality of first retardation regions of liquid crystal materials and a plurality of second retardation regions of curable resin, wherein the structures of the first retardation regions and the second retardation regions are grating-like stripe structures and parallelly interleaved with each other and the first retardation regions provide a first phase retardation and the second retardation regions provide a second phase retardation; and
   a second substrate laminated on the phase retardation layer;
   wherein the first phase retardation and the second phase retardation are different by 180°.

2. The patterned retarder film according to claim 1, wherein the thickness of the retardation layer is from 1 micron to 4 microns.

3. The patterned retarder film according to claim 1, wherein the first region of liquid crystal materials further comprises an alignment layer aligned with the liquid crystal materials in the plurality of the first regions.

4. The patterned retarder film according to claim 1, wherein the first substrate and the second substrate are independently selected from the group consisting of poly(ethylene terephthalate), polycarbonate, triacetyl cellulose, poly(methyl methacrylate) and cyclo-olefin polymer.

5. The patterned retarder film according to claim 1, wherein the first substrate and the second substrate are the same or different material.

6. The patterned retarder film according to claim 1, wherein the thickness of the first substrate is in the range of 30 microns to 300 microns.

7. The patterned retarder film according to claim 1, wherein the phase retardation of the first substrate is substantially 0°.

8. The patterned retarder film according to claim 1, wherein the curable resin is selected from the group consisting of acrylic resin, silicone and polyurethane.

9. The patterned retarder film according to claim 1, further comprising at least one of functional optical films selected from the group consisting of hard-coating film, low reflective film, anti-reflective film and anti-glaring film adhered thereon.

10. A method for manufacturing a patterned retarder film comprising the steps of:
    providing a first substrate;
    coating a curable resin on the first substrate;
    embossing the curable resin with a predetermined pattern to form a patterned configuration comprising a plurality of first regions and a plurality of second regions, wherein the patterned configuration has a grating-like stripe structure and of which the first regions are grating grooves and parallely interleaved with the second regions;
    curing the patterned configuration;
    forming an alignment layer on the patterned configuration;
    disposing a liquid crystal material on the alignment layer in the first regions of the patterned configuration in order together with the second regions to form a phase retardation layer;
    providing a second substrate;
    laminating the second substrate on the phase retardation layer; and
    aligning and curing the liquid crystal material in the first regions with the alignment layer to form a plurality of first retardation regions;
    wherein the first retardation regions provide a first phase retardation and the second regions provide a second phase retardation and the first phase retardation and the second phase retardation are different by 180°.

11. The method according to claim 10, wherein the first substrate and the second substrate are independently selected from the group consisting of poly(ethylene terephthalate), polycarbonate, triacetyl cellulose, poly(methyl methacrylate) and cyclo-olefin polymer.

12. The method according to claim 10, wherein the first substrate and the second substrate are the same or different material.

13. The method according to claim 10, wherein the thickness of the phase retardation layer is in the range of 1 micron to 4 microns.

14. The method according to claim 10, wherein the phase retardation of the first substrate is substantially 0°.

15. The method according to claim 10, wherein the curable resin is selected from the group consisting of acrylic resin, silicone and polyurethane.

16. The method according to claim 10, wherein the alignment layer is formed by a process selected from the group consisting of micro-scratch alignment treatment, rubbing treatment, photo-alignment, $SiO_2$ evaporation, and ion beam alignment.

17. The method according to claim 10, wherein the step of aligning the liquid crystal material with the alignment layer is conducted at the temperature in the range between about 50° C. to about 100° C.

18. The method according to claim 10, wherein the liquid crystal material is cured by a treatment selected from the group consisting of a UV curing treatment and a thermal curing treatment.

19. The method according to claim 10, further comprising the step of adhering at least one of functional optical films selected from the group consisting of hard-coating film, low reflective film, anti-reflective film and anti-glaring film to the patterned retarder film.

20. A method for manufacturing a patterned retarder film comprising the steps of:

providing a first substrate;

coating a curable resin on the first substrate;

embossing the curable resin with a predetermined pattern to form a patterned configuration comprising a plurality of first regions and a plurality of second regions, wherein the patterned configuration has a grating-like stripe structure and of which the first regions are grating grooves and parallely interleaved with the second regions;

curing the patterned configuration;

disposing a liquid crystal material in the first regions of the patterned configuration in order together with the second regions to form a phase retardation layer;

providing a second substrate with an alignment layer formed on the patterned configuration;

laminating the second substrate with the alignment layer on the phase retardation layer; and aligning and curing the liquid crystal material in the first regions with the alignment layer to form a plurality of first retardation regions;

wherein the first retardation regions provide a first phase retardation and the second regions provide a second phase retardation and the first phase retardation and the second phase retardation are different by 180°.

* * * * *